US012600860B2

(12) United States Patent
Menon et al.

(10) Patent No.: US 12,600,860 B2
(45) Date of Patent: Apr. 14, 2026

(54) DIRT-REPELLING CLEANING COMPOSITIONS AND METHODS OF USE THEREOF

(71) Applicant: Energizer Auto, Inc., St. Louis, MO (US)

(72) Inventors: Rajeev Menon, Dayton, OH (US); Hirotaka Uchiyama, Loveland, OH (US)

(73) Assignee: Energizer Auto, Inc., St. Louis, MO (US)

( * ) Notice: Subject to any disclaimer, the term of this patent is extended or adjusted under 35 U.S.C. 154(b) by 617 days.

(21) Appl. No.: 17/915,818

(22) PCT Filed: Apr. 1, 2021

(86) PCT No.: PCT/US2021/025396
§ 371 (c)(1),
(2) Date: Sep. 29, 2022

(87) PCT Pub. No.: WO2021/202884
PCT Pub. Date: Oct. 7, 2021

(65) Prior Publication Data

US 2023/0159757 A1 May 25, 2023

Related U.S. Application Data

(60) Provisional application No. 63/003,640, filed on Apr. 1, 2020.

(51) Int. Cl.

| | |
|---|---|
| ***C08L 83/08*** | (2006.01) |
| ***C08J 7/04*** | (2020.01) |
| ***C09D 183/08*** | (2006.01) |

(52) U.S. Cl.
CPC ............. *C08L 83/08* (2013.01); *C08J 7/0427* (2020.01); *C09D 183/08* (2013.01); *C08J 2483/08* (2013.01)

(58) Field of Classification Search
CPC . B60C 1/00; B60S 3/042; C08J 7/0427; C08J 2483/08; C08J 2483/04; C08G 77/26; C08L 83/08; C09D 183/08; C09G 1/16
See application file for complete search history.

(56) References Cited

U.S. PATENT DOCUMENTS

| | | | |
|---|---|---|---|
| 4,665,116 | A | 5/1987 | Kornhaber et al. |
| 5,913,969 | A | 6/1999 | Howe |
| 2010/0113662 | A1 | 5/2010 | Masutani et al. |
| 2013/0030114 | A1 | 1/2013 | Ackermann et al. |
| 2013/0260068 | A1 | 10/2013 | Serobian et al. |
| 2019/0375897 | A1 | 12/2019 | Gotou et al. |

FOREIGN PATENT DOCUMENTS

| | | |
|---|---|---|
| JP | H0834970 A | 2/1996 |

OTHER PUBLICATIONS

Machine Translation of Japan Patent Specification No. JPH 08-34970 A. (Year: 1996).*
Extended European Search Report issued by the European Patent Office on Apr. 16, 2024 for related European Application No. 21780893.0 (12 pages).
International Search Report and Written Opinion dated Jun. 29, 2021 in corresponding International Application No. PCT/US21/25396 (14 pages).
Office Action for Chinese Application No. 202180026804.7, Dated Jan. 8, 2026, 16 pages.
Examination Report for Australian Application No. 2021248387, Dated Feb. 27, 2026, 7 pages.

* cited by examiner

*Primary Examiner* — Anthony J Green
(74) *Attorney, Agent, or Firm* — Lee & Hayes, P.C.

(57) ABSTRACT

Described herein are dirt-repelling compositions and methods of use thereof. The compositions provide improved shine and color, as well as a non-oily finish. The compositions are durable and will prevent, for example, dirt and dust from sticking on an automotive surface.

17 Claims, 12 Drawing Sheets

DIRT-REPELLING CLEANING COMPOSITIONS AND METHODS OF USE THEREOF

CROSS-REFERENCE TO RELATED APPLICATIONS

This application is a U.S. national stage application under 35 U.S.C. § 371 of PCT International Application No. PCT/US2021/025396, filed Apr. 1, 2021, which claims the benefit of priority to U.S. Provisional Patent Application Ser. No. 63/003,640, entitled "Dirt-Repelling Compositions and Methods of Use Thereof." filed on Apr. 1, 2020, the content of both of which are hereby incorporated by reference in their entirety.

FIELD OF THE DISCLOSURE

Described herein are dirt-repelling compositions and methods of use thereof. The compositions provide improved shine and color, as well as a non-oily finish. The compositions are durable and will prevent, for example, dirt and dust from sticking on an automotive surface.

BACKGROUND OF THE DISCLOSURE

Conventional tire coatings and tire dressings are silicone oil-based. Silicone oil usually washes off with rain or while washing cars. Also, silicone oil-based products are tacky to touch and can attract dirt and dust to their surfaces. In order to provide a coating which lasts for a long time, tire coating/dressing products are usually made with very high viscosity silicone oil (>1000 cSt) as these usually are not easily removed from the surface due to, for example, rain. However, high viscosity silicone oil is very tacky to touch, and the gloss provided by these coatings fades upon washing the tire with a conventional car wash.

There is a need, therefore, for automotive surface compositions that provide improved shine and color, as well as a non-oily finish, that are durable and will prevent, for example, dirt and dust from sticking on or to, for example, a car tire.

SUMMARY OF THE DISCLOSURE

In one aspect, the present disclosure is directed to a composition comprising: an amino functional silicone, a silicone resin, and, a catalyst.

In another aspect, the present disclosure is directed to a method of treating an automotive surface. The method comprises: applying a composition to an automotive surface, wherein the composition comprises: an amino functional silicone, a silicone resin, and, a catalyst.

In yet another aspect, the present disclosure is directed to a composition comprising: an amino functional silicone; a silicone resin; optionally a catalyst; a first solvent; and, a second solvent.

In another aspect, the present disclosure is directed to a method of treating an automotive surface. The method comprises: applying a composition to an automotive surface, wherein the composition comprises: an amino functional silicone; a silicone resin; optionally a catalyst; a first solvent; and, a second solvent.

DETAILED DESCRIPTION OF THE DISCLOSURE

Figure 1A:
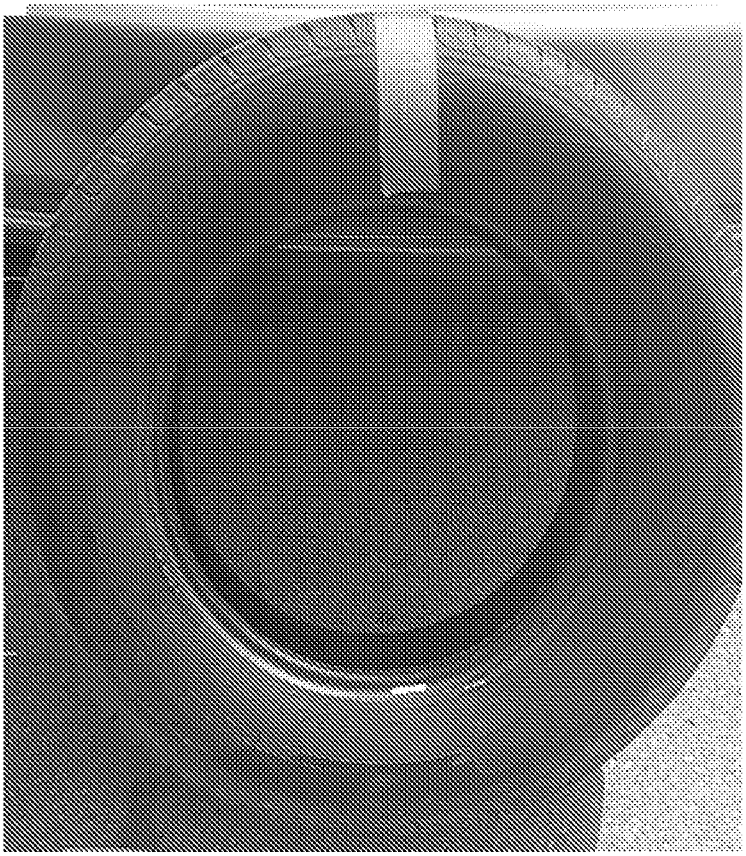
FIG. 1A depicts an uncoated car tire before application of a permanent tire coating in accordance with the present disclosure.

Described herein are dirt-repelling compositions and methods of use thereof. The compositions provide improved shine and color, as well as a non-oily finish. The compositions are durable and will prevent, for example, dirt and dust from sticking on an automotive surface.

The present disclosure is superior to conventional products in that the compositions do not include straight silicone oil, but, rather, comprise functionalized silicones such as amino functional silicone and silicone resins such as M, Q, D, T or a combination of MQ, QT etc. Upon combining these two organo-modified silicones at a specific ratio, along with a catalyst, and applying the product on the automotive surface, a coating will be formed on the surface within about 5-10 minutes under the sun, which provides high shine as well as color which is non-tacky and dry to the touch (i.e., a non-oily finish) and cannot be scrubbed or washed with car wash and high pH alkaline cleaners. This ensures durability of the coating for a very long time and being non-tacky and non-oily to touch will prevent dirt, dust and water borne dirt from sticking on the tire.

In some embodiments, a semi-permanent coating composition can also be achieved by diluting the amino silicone and silicone resins at a specific ratio, optionally along with a catalyst, in combination of solvents that air dry slowly at room temperature. These coating compositions will be dry to the touch, non-tacky and are also resilient to car wash and pH cleaner. The compositions can be scrubbed off with a microfiber towel if desired with strong abrasion.

In preferred embodiments, the semi-permanent compositions in accordance with the present disclosure do not comprise a catalyst.

Permanent Coating

In some embodiments of the present disclosure, a permanent coating composition comprises an amino functional silicone, a silicone resin; and, a catalyst.

In some embodiments, a method of treating an automotive surface is disclosed. The method comprises: applying a composition to an automotive surface, wherein the composition comprises: an amino functional silicone, a silicone resin; and, a catalyst.

In some embodiments, the amino functional silicone is an aminoalkyl-functional organopolysiloxane. In some embodiments, the amino functional silicone is selected from the group consisting of ELKAY® 1145C (i.e. a mixture of Aminoethylaminopropylmethoxysiloxane - dimethylsiloxane copolymer (80 wt%) and Octyltriethoxysilane (20 wt %)) and XIAMETER™ OFX-536 (i.e. a mixture of Dimethyl siloxane, HO-term Rxn methyltrimethoxysilane and aminoethylaminopropyltrimethoxysilane (91-95 wt. %), methanol (3-5 wt. &), decamethylcyclopentasiloxane (0.87-1.09 wt. %), and octamethyl cyclotetrasiloxane (0.58-1.02 wt. %)). In some embodiments, the amino functional silicone comprises a pendant amine/dimethyl copolymer, an amine/alkoxy end-blocked silicone, and amine end-blocked silicone, an amine functional paintable silicone fluid, and combinations thereof.

In some embodiments, the pendant amine/dimethyl copolymer is selected from the group consisting of amine-alkyl/dimethyl copolymers-GP-4 (Siloxanes and Silicones, 3-aminopropyl mthhyl, dimethyl), GP-6 (Siloxanes and Silicones, 3-aminopropyl methyl, dimethyl), and GP-581 (amine functional silicone polymer) from Genesee Polymers Corporation. The chemical structure of these polymers is shown below:

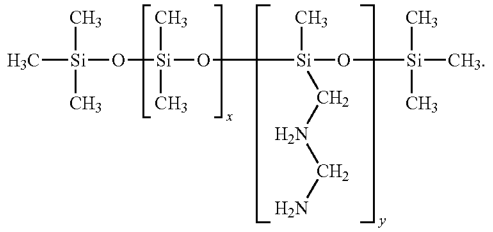

| Product | x | y | Viscosity (CPS) @ 25° C. | Amine # |
|---|---|---|---|---|
| GP-4 | 58 | 4 | 125 cP | 90 |
| GP-6 | 100 | 4 | 275 cP | 49 |
| GP-581 | 118 | 11 | 400 cP | 110 |

In some embodiments, the amino functional silicone comprises a polar amine/alkyl functional block selected from the group consisting of GP-988-1 (Siloxanes and Silicones, 3-[(2-aminoethyl)amino]propyl methyl, dimethyl), GP-344 (amino functional silicone polymer), GP-997 (Siloxanes and Silicones, 3-[(2-aminoethyl)amion)propyl methyl, dimethyl), GP-316 (Siloxanes and Silicones, 3-[(2-aminoethyl)amino]propyl methyl, dimethyl), and GP-342 (Siloxanes and Silicones, 3-[(2-aminothyl)amino]propyl methyl, dimethyl) also from Genesee Polymers Corporation. The chemical structure of these polymers is shown below:

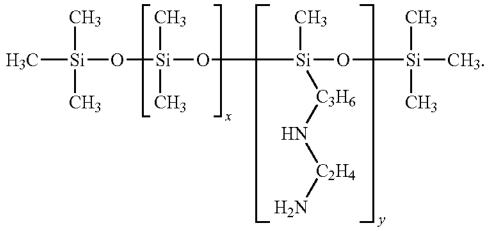

| Product | x | y | Viscosity (CPS) @ 25° C. | Amine # |
|---|---|---|---|---|
| GP-988-1 | 95 | 5 | 200 cP | 130 |
| GP-344 | 200 | 2 | 700 cP | 27 |
| GP-997 | 400 | 3.4 | 2000 cP | 24 |
| GP-316 | 400 | 8 | 3000 cP | 54 |
| GP-342 | 400 | 1 | 3300 cP | 8 |

In some embodiments, the amino functional silicone comprises an amine/alkoxy end-blocked silicone selected from the group consisting of GP-RA-157 (amino functional silicone fluid with amine-alkyl and hydeolysable Si-alkoxy functional groups), GP-657 (Siloxanes and Silicones, dimethyl, [[(3-aminopropyl)dimethoxysilyl]oxy]-terminated), GP-34 (Siloxanes and Silicones, di-Me, (((3-aminopropyl) dimethoxysilyl)oxy-terminated), GP-846 (Siloxanes and Silicones, di-Me, (((3-((2-aminoethyl)amino)propyl)silylidyne)tris(oxy))tris-), GP-871 (Polydimethylsiloxane with aminoalkyl groups), and GP-145 (Siloxanes and Silicones, dimethyl, hydroxy-terminated, reaction products with 3-(diethoxymethylsilyl)-1-propanamine).

In some embodiments, the amino functional silicone comprises an amine end-blocked silicone selected from the group consisting of GP-967 (1,3-bis (3-aminopropyl)tetramethyldisiloxane), GP-965 (Polydimethylsiloxane, 3-aminopropyl-terminated (98-100 wt. %), 3,3-(1,1,3,3-tetramethyldisiloxane-1,3-diyl)bispropylamine (<2.5 wt.%)), GP-654 (aminoalkyl terminated dimethyl silicone polymer), and GP-966 (aminopropyl terminated polydimethylsiloxane). The chemical structure of these polymers is shown below:

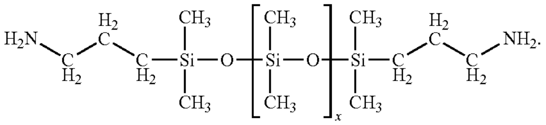

| Product | x | Viscosity (CPS) @ 25° C. | Amine # |
|---|---|---|---|
| GP-967 | 0 | 5 cP | 805 |
| GP-965 | 10 | 15 cP | 200 |
| GP-654 | 92 | 180 cP | 28 |
| GP-966 | 334 | 2000 cP | 8 |

In some embodiments, the amino functional silicone comprises an amine functional paintable silicone, such as GP-7100 (Siloxanes and Silicones, 3-aminopropul methyl, lauryl methyl, methyl 2-phenylpropyl (50.1139 wt. %), Water (42 wt.%), Polyoxyethylene tridecyl ethere (7.46 wt.%), 1,3,5-Triazine-1,3,5(2H,4H,6H)-triethanol (0.1139 wt.%)), which has the following chemical structure:

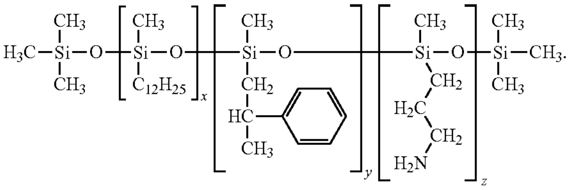

In some embodiments, the silicone resin is selected from the group consisting of M, Q, T, D, MQ, MT, MD, QT, MDT, MOT and combinations thereof. In some embodiments, the silicone resin is MQ. In some embodiments, the MQ resin is BELSIL® TMS803. In some embodiments, the silicone resin comprises a resin selected from the group consisting of BELSIL® TMS803 and DOWSIL™ FBL-0563.

BELSIL® TMS 803 is (100% active) and comprises a co-hydrolysis product of tetraalkoxysilane (Q unit) and trimethylethoxysilane (M unit). The chemical structure of BELSIL® TMS 803 is a three-dimensional network of polysilic acid units, which are endblocked with trimethylsilyl groups. Some residual ethoxy and hydroxy functions are present.

DOWSIL™ FBL-0563 comprises an MQ resin and a T resin combination (about 30.5 wt. %), a tetraisopropyl titanante catalyst (about 12 wt. %) and a hydrocarbon solvent (about 57.5 wt. %).

In some embodiments, the silicone resin is a T resin. In some embodiments, the T resin is ELKAY® LK Q1000, i.e. a methyl phenyl silicone resin with alkoxy functionality 60% in xylene.

In some embodiments, the amino functional silicone and the silicone resin are present in a ratio of from about 1:1 to about 15:1, from about 2:1 to about 12:1, or from about 3:1 to about 9:1. In some embodiments, the amino functional silicone and the silicone resin are present in a ratio of from about 4:1 to about 6:1. In some embodiments, the amino functional silicone and the silicone resin are present in a ratio of about 5:1.

In some embodiments, functional silicone is selected from the group consisting of ELKAY® 1145C and GP-4, and the silicone resin is DOWSIL™ FBL-0563. In some embodiments, the permanent coating composition comprises about 60 wt. % GP-4 and about 40 wt. % DOWSIL™ FBL-0563, by weight of the amino functional silicone.

In some embodiments, the catalyst comprises titanium, tin, or a combination thereof. In some embodiments, the catalyst comprises titanium (IV) isopropoxide. In some embodiments, the catalyst is present in an amount of from about 0.5% to about 10% based on the weight of the composition. In some embodiments, the catalyst is present in an amount of from about 3% to about 6% based on the weight of the composition.

In some embodiments, the composition is applied to an automotive surface. In some embodiments, the automotive surface is a tire. In some embodiments, the composition remains on the automotive surface after at least about 25, 50, 75 or 100 washes. In some embodiments, the composition remains on the automotive surface for at least about one year, about two years, or more.

In some embodiments, the composition is a gel, fluid (such as a liquid), an aerosol, and combinations thereof. In some embodiments, the composition is applied using a trigger sprayer, aerosol, sponge, paint coating rollers, and combinations thereof.

In some embodiments, the composition dries within about 3 to about 15, within about 5 to about 10, or within about 7 minutes after application to the automotive surface when exposed to direct sunlight. In some embodiments, the composition dries within about an hour if not exposed to direct sunlight.

In some embodiments, upon applying mixture of the two functionalized silicones at a specific ratio, along with a catalyst, the amino functional silicone bonds with the sulfur on the tire while the silicone resins polymerize on the surface of the tire, providing a cross-linked structure that ensures adhesion of the chemistry. The amino group is present to provide a glossy finish while the silicone resin is used for forming a layer on top of the amino silicone and locking the gloss on the surface.

It was observed that as long as from an about 3:1 to about 9:1 ratio is maintained between the amino functional and silicone resin, improved gloss and durability are present. In some embodiments, an adequate amount of catalyst is also added for polymerization of the silicone resin on the surface.

In some embodiments, no special processing steps are necessary to create the blended fluid. In some embodiments, the mixture is dosed onto a sponge or wipe or directly applied on to the tire and spread evenly across the tire surface and let to air dry for about 20 to about 30 minutes. In some embodiments, the composition is aerosolized and sprayed or sprayed directly on the tire as well using a trigger spray. Drying time can be faster based on the weather or if the tire is allowed to dry in the sun.

Semi-Permanent Coating

In some embodiments of the present disclosure, a semi-permanent coating composition is disclosed. The composition comprises: an amino functional silicone, a silicone resin; optionally a catalyst; a first solvent; and, a second solvent.

In some embodiments, a method of treating an automotive surface with a semi-permanent coating composition is disclosed. The method comprises: applying a composition to an automotive surface, wherein the composition comprises: an amino functional silicone, a silicone resin; optionally a catalyst; a first solvent; and, a second solvent.

In some embodiments, the amino functional silicone is an aminoalkyl-functional organopolysiloxane. In some embodiments, the amino functional silicone is selected from the group consisting of ELKAY® 1145C and XIAMETER™ OFX-0536. In some embodiments, the amino functional silicone comprises a pendant amine/dimethyl copolymer, an amine/alkoxy end-blocked silicone, and amine end-blocked silicone, an amine functional paintable silicone fluid, and combinations thereof.

In some embodiments, the pendant amine/dimethyl copolymer is selected from the group consisting of amine-alkyl/dimethyl copolymers-GP-4, GP-6, and GP-581 from Genesee Polymers Corporation. The chemical structure of these polymers is shown below:

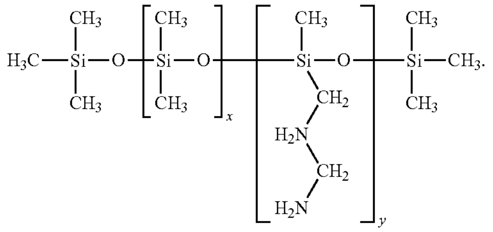

| Product | x | y | Viscosity (CPS) @ 25° C. | Amine # |
|---|---|---|---|---|
| GP-4 | 58 | 4 | 125 cP | 90 |
| GP-6 | 100 | 4 | 275 cP | 49 |
| GP-581 | 118 | 11 | 400 cP | 110 |

In some embodiments, the amino functional silicone comprises a polar amine/alkyl functional block selected from the group consisting of GP-988-1, GP-344, GP-997, and GP-316 also from Genesee Polymers Corporation. The chemical structure of these polymers is shown below:

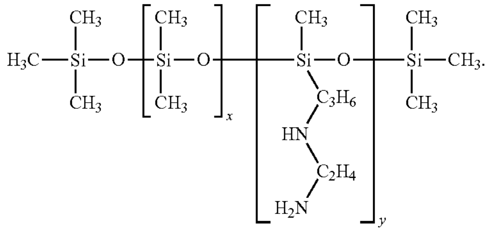

| Product | x | y | Viscosity (CPS) @ 25° C. | Amine # |
|---|---|---|---|---|
| GP-988-1 | 95 | 5 | 200 cP | 130 |
| GP-344 | 200 | 2 | 700 cP | 27 |
| GP-997 | 400 | 3.4 | 2000 cP | 24 |
| GP-316 | 400 | 8 | 3000 cP | 54 |
| GP-342 | 400 | 1 | 3300 cP | 8 |

In some embodiments, the amino functional silicone comprises an amine/alkoxy end-blocked silicone selected from the group consisting of GP-RA-157, GP-657, GP-34, GP-846, GP-871, and GP-145.

In some embodiments, the amino functional silicone comprises an amine end-blocked silicone selected from the group consisting of GP-967, GP-965, GP-654, and GP-966. The chemical structure of these polymers is shown below:

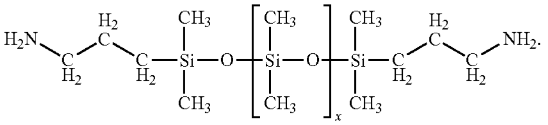

| Product | x | Viscosity (CPS) @ 25° C. | Amine # |
|---|---|---|---|
| GP-967 | 0 | 5 cP | 805 |
| GP-965 | 10 | 15 cP | 200 |
| GP-654 | 92 | 180 cP | 28 |
| GP-966 | 334 | 2000 cP | 8 |

In some embodiments, the amino functional silicone comprises an amine functional paintable silicone, such as GP-7100, which has the following chemical structure:

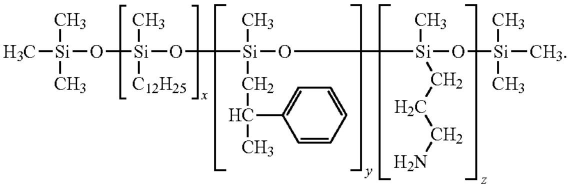

In some embodiments, the amino silicone and silicone resin are present between the ratio of from about 1:1 to about 9:1 (amino to resin), and optionally with about 0.1 to about 2 wt. & catalyst, and the rest is a combination of the first and second solvent. In some embodiments, it has been observed that the first solvent should be ≤50% of the second solvent. For example, when the amino silicone and silicone resin and optionally catalyst add up to 25 wt. %, then the first and second solvent should be 75 wt. %. Thus, in some embodiments, when the second solvent is 50 wt. % or above, then the first solvent is 25 wt. % or below.

In some embodiments, the silicone resin is selected from the group consisting of M, Q, T, D, MQ, MT, MD, QT, MDT, MQT and combinations thereof. In some embodiments, the silicone resin is MQ. In some embodiments, the MQ resin is BELSIL® TMS803. In some embodiments, the silicone resin comprises a resin selected from the group consisting of BELSIL® TMS803 and DOWSIL™ FBL-0563. In some embodiments, the silicone resin is a T resin. In some embodiments, the T resin is ELKAY® LK Q1000 M.

In some embodiments, the amino functional silicone and the silicone resin are present at a ratio of from about 0.1:1 to about 15:1, from about 0.5:1 to about 12:1, or from about 1:1 to about 9:1. In some embodiments, the amino functional silicone and the silicone resin are present at a ratio of from about 1:1 to about 3:1, or from about 1.5:1 to about 2:1. In some embodiments, the amino functional silicone and the silicone resin are present at a ratio of about 1.7:1.

In some embodiments, the catalyst comprises titanium, tin, or a combination thereof. In some embodiments, the catalyst comprises titanium (IV) isopropoxide. In some embodiments, the catalyst is present in an amount of from about 0.5% to about 10% based on the weight of the composition. In some embodiments, the catalyst is present in an amount of from about 3% to about 6% based on the weight of the composition. In some preferred embodiments, the composition does not comprise a catalyst.

In some embodiments, the first solvent is selected from the group consisting of a hydrocarbon and a silicone solvent. In some embodiments, the first solvent is cyclopentasiloxane.

In some embodiments, the first solvent has a flash point of from about 50° C. to about 80° C. In some embodiments, the second solvent has a flash point of at least about 90° C. In some embodiments, the second solvent is capable of completely dissolving the first solvent.

In some embodiments, the second solvent is soluble in water. In some embodiments, the second solvent comprises a glycol ether. In some embodiments, the glycol ether is selected from the group consisting of butyl CARBITOL™ (Diethylene glycol monobutyl ether), dipropylene glycol n-butyl ether (DPnB), and combinations thereof.

In some embodiments, the first solvent is a non-volatile organic compound solvent. In some embodiments, the second solvent is a non-volatile organic compound solvent. In some embodiments, the first or second solvent are volatile organic compound solvents, either individually or at the same time.

In some embodiments, the composition is applied to an automotive surface. In some embodiments, the automotive surface is a tire.

In some embodiments, the composition remains on the automotive surface after at least about 5 hand washes or at least about 10 hand washes. In some embodiments, the composition remains on the automotive surface after at least about 3 automatic car washes. In some embodiments, the composition remains on the automotive surface for at least about 4 weeks, 5 weeks, or more.

In some embodiments, the composition is a gel, fluid (such as liquid), an aerosol, and combinations thereof. In some embodiments, the composition is applied using a trigger sprayer, aerosol, sponge, paint coating rollers, and combinations thereof.

In some embodiments, the composition dries within about 1 to about 10, within about 2 to about 7, or within about 3 to about 5 hours after application to the automotive surface when exposed to direct sunlight. In some embodiments, the composition dries within about 24 hours if not exposed to direct sunlight.

In some embodiments, the composition is removable with physical abrasion.

In some embodiments, the composition comprises ELKAY® 1145C, DOWSIL™ FBL-0563, BELSIL® TMS 803, cyclopentasiloxane and butyl CARBITOL™. In some embodiments, the composition comprises ELKAY® 1145C, ELKAY® Q1000 M, BELSIL™ TMS 803, cyclopentasiloxane and butyl CARBITOL ™.

In some embodiments, a semi-permanent coating is defined as any coating that would form a non-tacky, non-oily and dry to touch finish on the surface, which doesn't wash off with car wash or alkaline pH cleaners but comes off with physical abrasion. To achieve a semi-permanent coating, in some embodiments, the active elements are present in a ratio of from about 1:1 to about 9:1, optionally along with a catalyst, and these elements are dissolved in a combination of solvents.

The solvents are preferably non-VOC solvents or solvents with an EPA exemption and that are classified as non-VOC. In some embodiments, VOC solvents are used. In some embodiments, the semi-permanent coating composition comprises a combination of moderately evaporating and slowly evaporating solvents. In some embodiments, the moderately evaporating solvent is a hydrocarbon or silicone solvent, such as D4 (Octamethylcyclotetrasiloxane)or such as D5 (LK-145, i.e. cyclopentasiloxane).

In some embodiments, the moderately evaporating solvent has a flash point of from about 50° C. to about 80° C. In some embodiments, the second solvent is either a single solvent or a solvent combination. The second solvent combination may either be a single solvent or a mixture of solvents but needs to meet two criteria. First, it must have a flash point of greater than 90° C. Second, it must be able to dissolve silicone and hydrocarbon solvents completely and should also have limited-to-full solubility in water. Examples of solvents that fit this description are slow evaporating glycol ethers, such as butyl CARBITOL™ and dipropylene Glycol N-Butyl Ether (DPnB). Both these solvents are slow evaporating and allow the active ingredients to coalesce. DPnB has a solubility of 4.5 wt. % in water. Butyl butyl CARBITOL™ has 100% solubility in water.

In some embodiments, the second solvent has a flash point of greater than 90 C and is able to dissolve silicone and hydrocarbon solvents completely, as well as have limited to full solubility in water. In some embodiments, the second solvent is selected from the group consisting of butyl butyl CARBITOL™ and dipropylene glycol n-butyl ether (DPnB), both of which evaporate slowly and allow the active elements in the composition to coalesce.

In some embodiments, the second solvent has a water solubility of at least 2 wt. %. In some embodiments, the second solvent has a water solubility of at least 4 wt. %. In some embodiments, the second solvent is fully soluble in water. solubility of at least 100 wt. %.

In some embodiments, the semi-permanent coating composition of Table 1 has the following formulation shown in the column that says wt. % in conc. In some embodiments, the composition is in an aerosol format shown in the column that says wt. % in form, formed by adding 9 wt. % of hydrocarbon propellant to 91 wt. % concentrate.

TABLE 1

Sample semi-permanent formulation.

| Ingredient | Wt. % in form | Wt. % in conc. |
|---|---|---|
| ELKAY ® 1145C | 12.7400% | 14.00% |
| BELSIL ® TMS 803 | 1.8200% | 2.00% |
| DOWSIL ® FBL-0563 | 4.7320% | 5.20% |
| LK Q 1000M | 6.5520% | 7.20% |
| LK-145 (D5) | 20.0200% | 22.00% |
| Butyl CARBITOL ™ | 45.1360% | 49.60% |
| Total | 91.0000% | 100.00% |
| A-70 Propellant | 9.00% | |

In some embodiments, the semi-permanent coating composition of Table 2 has the following formulation shown in the column that says wt. % in conc. In some embodiments, the composition is in an aerosol format shown in the column that says wt. % in form, formed by adding 9 wt. % of hydrocarbon propellant to 91 wt. % concentrate:

TABLE 2

| Sample semi-permanent formulation. | | |
|---|---|---|
| Ingredient | Wt. % in form | Wt. % in conc. |
| ELKAY ® 1145C | 12.74% | 14.00% |
| BELSIL ® TMS 803 | 4.10% | 4.50% |
| LK Q 1000M | 3.64% | 4.00% |
| LK-145 (D5) | 20.02% | 22.00% |
| Butyl CARBITOL ™ | 50.51% | 55.50% |
| Total | 91.00% | 100.00% |
| A-70 Propellant | 9.00% | |

In some embodiments, the permanent coating composition of Table 3 has the following formulation shown in the column that says wt. % in conc.

TABLE 3

| Sample permanent formulation. | |
|---|---|
| Ingredient | Wt. % in conc. |
| ELKAY ® 1145C | 60.00% |
| DOWSIL ® FBL-0563 | 40.00% |
| Total | 100.00% |

The embodiments of this disclosure include:

1. A composition comprising:
an amino functional silicone,
a silicone resin; and,
a catalyst.

2. The composition of embodiment 1, wherein the amino functional silicone is an aminoalkyl-functional organopolysiloxane.

3. The composition of embodiment 1, wherein the amino functional silicone is selected from the group consisting of ELKAY® 1145C and XIAMETER™ OFX-0536.

4. The composition of embodiment 1, wherein the silicone resin is selected from the group consisting of M, Q, T, D, MQ, MT, MD, QT, MDT, MOT and combinations thereof.

5. The composition of embodiment 4, wherein the silicone resin is MQ.

6. The composition of embodiment 5, wherein the MQ resin is selected from the group consisting of BELSIL® TMS803 and DOWSIL™ FBL-0563.

7. The composition of embodiment 4, wherein the silicone resin is a T resin.

8. The composition of embodiment 7, wherein the T resin is ELKAY® LK Q1000 M.

9. The composition of embodiment 1, wherein amino functional silicone and the silicone resin are present in a ratio of from about 1:1 to about 15:1, from about 2:1 to about 12:1, or from about 3:1 to about 9:1.

10. The composition of embodiment 9, wherein the amino functional silicone and the silicone resin are present in a ratio of from about 4:1 to about 6:1.

11. The composition of embodiment 9, wherein the amino functional silicone and the silicone resin are present in a ratio of about 5:1.

12. The composition of embodiment 1, wherein the amino functional silicone is ELKAY® 1145C or GP-4, and the silicone resin is DOWSIL™ FBL-0563.

13. The composition of embodiment 1, wherein the catalyst comprises titanium, tin, or a combination thereof.

14. The composition of embodiment 13, wherein the catalyst comprising titanium (IV) isopropoxide.

15. The composition of embodiment 1, wherein the catalyst is present in an amount of from about 0.5% to about 10% based on the weight of the composition.

16. The composition of embodiment 15, wherein the catalyst is present in an amount of from about 3% to about 6% based on the weight of the composition.

17. The composition of embodiment 1, wherein the composition is applied to an automotive surface.

18. The composition of embodiment 17, wherein the automotive surface is a tire.

19. The composition of embodiment 18, wherein the composition remains on the automotive surface after at least about 25, 50, 75 or 100 washes.

20. The composition of embodiment 18, wherein the composition remains on the automotive surface for at least about one year, about two years, or more.

21. A method of treating an automotive surface, the method comprising:
applying a composition to an automotive surface, wherein the composition comprises:
an amino functional silicone,
a silicone resin; and,
a catalyst.

22. A composition comprising:
an amino functional silicone;
a silicone resin;
optionally a catalyst;
a first solvent; and,
a second solvent.

23. The composition of embodiment 22, wherein the amino functional silicone is an aminoalkyl-functional organopolysiloxane.

24. The composition of embodiment 22, wherein the amino functional silicone is selected from the group consisting of ELKAY® 1145C and XIAMETER™ OFX-0536.

25. The composition of embodiment 22, wherein the silicone resin is selected from the group consisting of M, Q, T, D, MQ, MT, MD, QT, MDT, MOT and combinations thereof.

26. The composition of embodiment 25, wherein the silicone resin is MQ.

27. The composition of embodiment 26, wherein the MQ resin is selected from the group consisting of BELSIL® TMS803 and DOWSIL™ FBL-0563.

28. The composition of embodiment 25, wherein the silicone resin is a T resin.

29. The composition of embodiment 28, wherein the T resin is ELKAY® LK Q1000 M.

30. The composition of embodiment 22, wherein amino functional silicone and the silicone resin are present in a ratio of from about 0.1:1 to about 15:1, from about 0.5:1 to about 12:1, or from about 1:1 to about 9:1.

31. The composition of embodiment 30, wherein the amino functional silicone and the silicone resin are present in a ratio of from about 1:1 to about 3:1, or from about 1.5:1 to about 2:1.

32. The composition of embodiment 31, wherein the amino functional silicone and the silicone resin are present in a ratio of about 1.7:1.

33. The composition of embodiment 22, wherein the composition does not comprise a catalyst.

34. The composition of embodiment 22, wherein the catalyst comprises titanium, tin, or a combination thereof.

35. The composition of embodiment 34, wherein the catalyst comprises titanium (IV) isopropoxide.

36. The composition of embodiment 22, wherein the catalyst is present in an amount of from about 0.5% to about 10% based on the weight of the composition.

37. The composition of embodiment 36, wherein the catalyst is present in an amount of from about 3% to about 6% based on the weight of the composition.

38. The composition of embodiment 22, wherein the first solvent is selected from the group consisting of a hydrocarbon and a silicone solvent.

39. The composition of embodiment 38, wherein the first solvent is cyclopentasiloxane.

40. The composition of embodiment 22, wherein the first solvent has a flash point of from about 50° C. to about 80° C.

41. The composition of embodiment 22, wherein the second solvent has a flash point of at least about 90° C.

42. The composition of embodiment 22, wherein the second solvent is capable of completely dissolving the first solvent.

43. The composition of embodiment 22, wherein the second solvent has limited to full solubility in water.

44. The composition of embodiment 22, wherein the second solvent comprises a glycol ether.

45. The composition of embodiment 44, wherein the glycol ether is selected from the group consisting of butyl CARBITOL™, dipropylene glycol n-butyl ether (DPnB), and combinations thereof.

46. The composition of embodiment 22, wherein the first solvent is a non-volatile organic compound solvent.

47. The composition of embodiment 22, wherein the second solvent non-volatile organic compound solvent.

48. The composition of embodiment 22, wherein the composition is applied to an automotive surface.

49. The composition of embodiment 48, wherein the automotive surface is a tire.

50. The composition of embodiment 49, wherein the composition remains on the automotive surface for at least about 4 weeks, 5 weeks, or more.

51. The composition of embodiment 22, wherein the composition comprises ELKAY® 1145C, LK Q 1000M, VELSIL® TMS 803, cyclopentasiloxane and butyl CARBITOL™.

52. A method of treating an automotive surface, the method comprising:

applying a composition to an automotive surface, wherein the composition comprises:

an amino functional silicone;

a silicone resin;

optionally a catalyst;

a first solvent; and, a second solvent.

EXAMPLES

Example 1—Permanent Coating

For a permanent coating, ratios of 3:1 to 9:1 of amino functional silicone to silicone resin were run and were shown to have good results. One example is 60 wt. % of ELKAY® 1145C and 40 wt. % of dowsil™ FBL-0563. FBL-0563 is a combination of silicone resin dissolved in a Stoddard solvent, along with a catalyst. It has approximately 12 wt. % of titanium-based catalyst and 30.5 wt. % of silicone resin.

Example 2—Semi-Permanent Coating

For the semi-permanent coating example, ratios of 1:1 to 9:1 of amino functional silicone to silicone resin were run and were shown to have good results. One example of such a semi-permanent coating is 14 wt. % of ELKAY® 1145 C, 5.88 wt. % of DOWSIL™ FBL-0563 and 6.4 wt. % of BELSIL® TMS 803, 20.82 wt. % of Cyclopentasiloxane and 52.9 wt. % of Butyl CARBITOL™.

Example 3—Semi-Permanent Coating

For the semi-permanent coating example, ratios of 1:1 to 9:1 of amino functional silicone to silicone resin were run and were shown to have good results. One example of such a semi-permanent coating is 14 wt. % of ELKAY® 1145 C, 4.5 wt. % of BELSIL™ TMS 803, 4 wt. % of LK Q 1000M, 22 wt. % of Cyclopentasiloxane (LK-145), and 55.5 wt. % of Butyl CARBITOL™.

Example 4—Permanent Tire Coating

Figure 1B:
FIG. 1B depicts a coated car tire immediately after application of a permanent tire coating in accordance with the present disclosure. The left side of the tire is coated with a comparative silicone-based tire coating which claims to be long-lasting and the right side of the tire is coated with a permanent tire coating in accordance with the present disclosure.
Figure 1C:
FIG. 1C depicts clean black gloves before rubbing along a coated tire to demonstrate that a comparative tire coating is oily while the permanent tire coating in accordance with the present disclosure is non-oily.
Figure 1D:
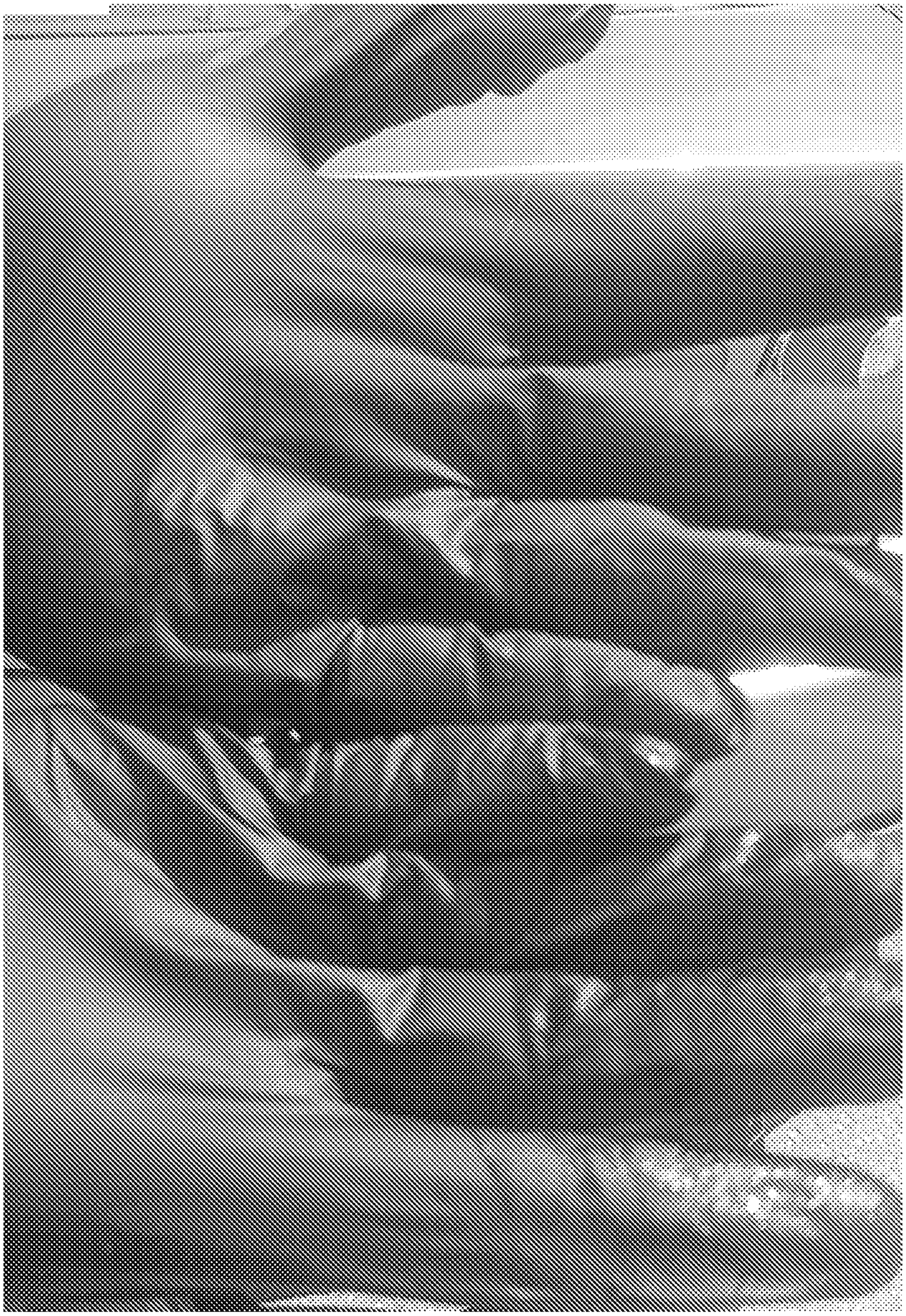
FIG. 1D depicts used black gloves after rubbing along a coated tire to demonstrate that a comparative silicone-based tire coating which claims to be long-lasting is oily (bottom glove) while the permanent tire coating in accordance with the present disclosure is non-oily (top glove).
Figure 1E:
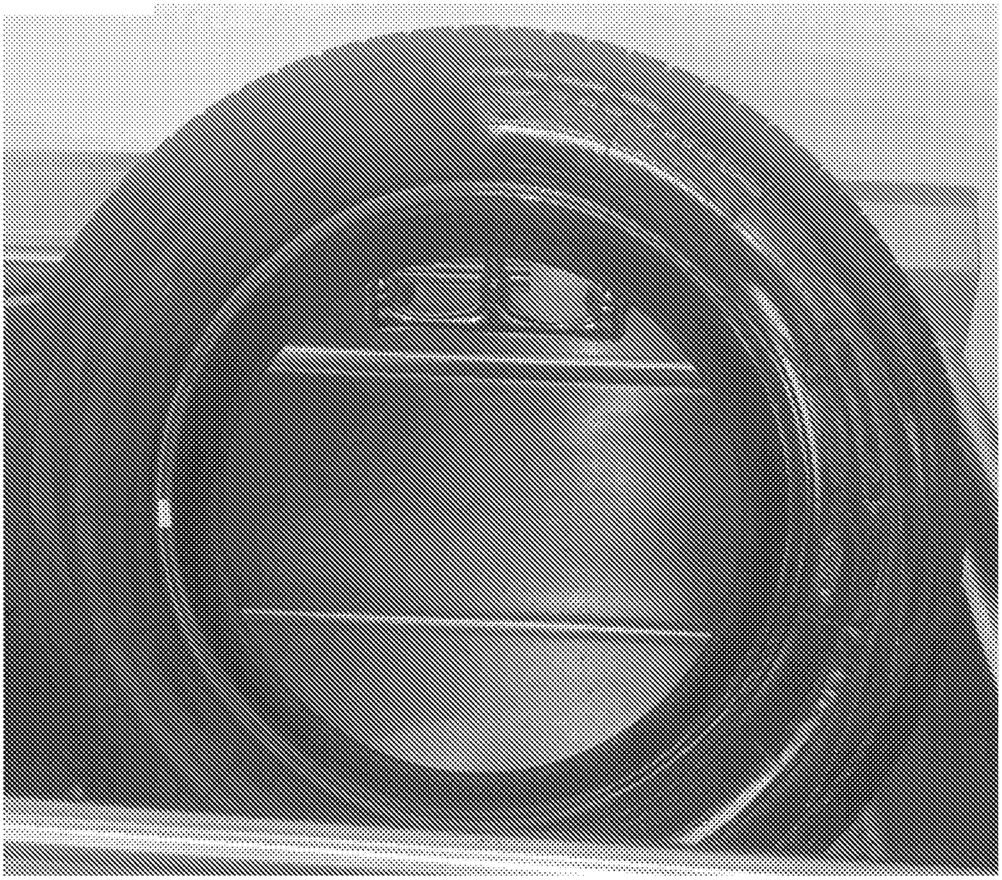
FIG. 1E depicts a coated car tire immediately after multiple cycles of washing and drying. The left side of the tire is coated with a comparative silicone-based tire coating which claims to be long-lasting and the right side of the tire is coated with a permanent tire coating in accordance with the present disclosure.
Figure 1F:
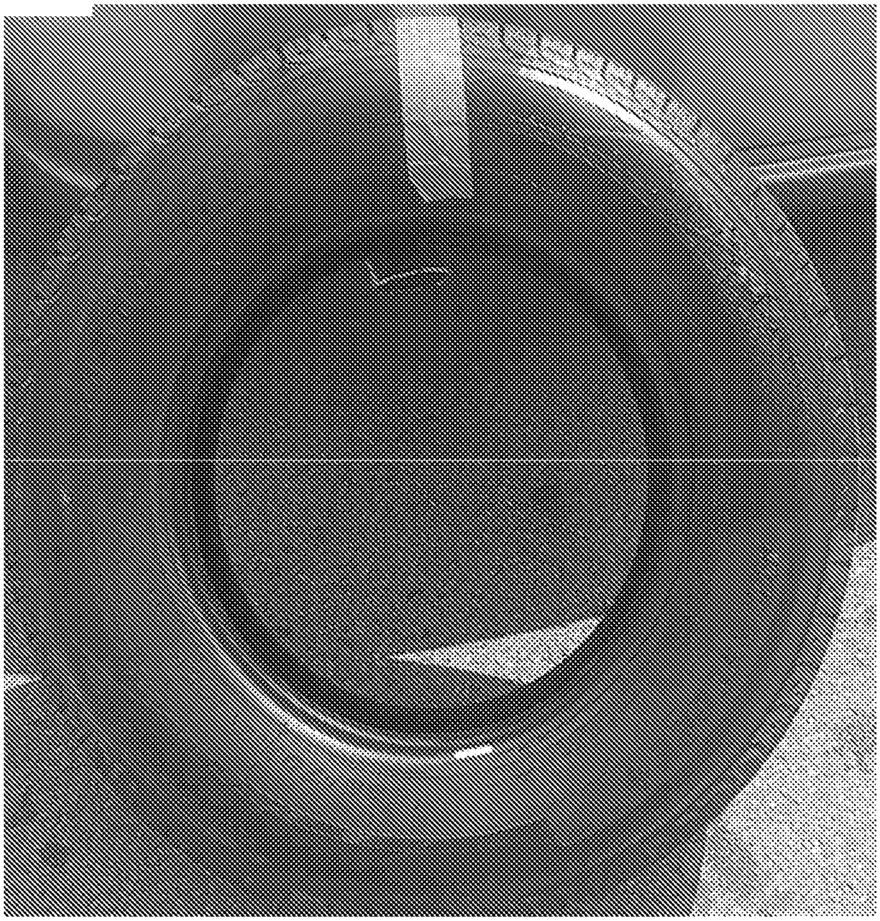
FIG. 1F depicts a coated car tire after multiple cycles of washing and full drying in the sun. The left side of the tire is coated with a comparative silicone-based tire coating which claims to be long-lasting and the right side of the tire is coated with a permanent tire coating in accordance with the present disclosure.
Figure 2A:
FIG. 2A depicts an uncoated car tire before application of a semi-permanent tire coating in accordance with the present disclosure.
Figure 2B:
FIG. 2B depicts a coated car tire after a semi-permanent tire coating in accordance with the present disclosure has dried.
Figure 2C:
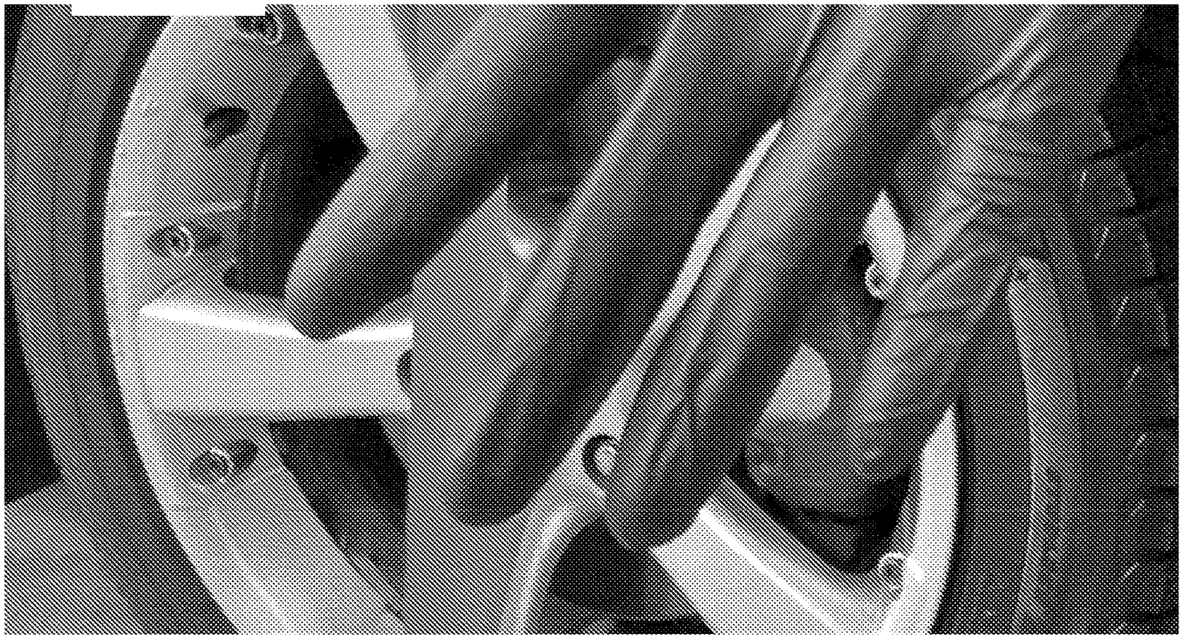
FIG. 2C depicts a black glove before rubbing along a coated tire to demonstrate that the semi-permanent tire coating in accordance with the present disclosure is non-oily.
Figure 2D:
FIG. 2D depicts a black glove after rubbing along a coated tire to demonstrate that the semi-permanent tire coating in accordance with the present disclosure is non-oily.
Figure 2E:
FIG. 2E depicts a coated tire after muddy water was thrown on it to demonstrate that the semi-permanent tire coating in accordance with the present disclosure exhibits dirt repellency.

The formulation of Table 3 is demonstrated in FIGS. 1A-1F. FIG. 1B shows a comparative silicone-based tire shine gel coating which claims to be long-lasting (formula shown in Table 4) applied on the left side of a tire and the formulation of Table 3 on the right side of the tire. Both compositions were let to sit in the sunlight for 10 minutes and then taken to wash with car wash and a scrubby sponge. Before washing, it was shown that the side with the comparative tire shine gel is oily while the permanent tire coating in accordance with the present disclosure is non-oily. This is demonstrated by wearing a black glove and rubbing the black glove on the tire. It was also shown that after multiple washes, the side with the comparative tire shine gel gets completely removed whereas the side with the permanent tire coating still remains on the surface (FIGS. 1E and 1F).

The comparative tire shine gel uses high viscosity silicone oil. FIGS. 1E and 1F demonstrate the coatings after washing. As can be seen, the right side of the tire, where the permanent tire coating was applied, is still shiny. The car wash solution that was used is a foam car wash with very high amounts of cleaning surfactants. The dilution ratio used for this car wash was 1 oz. of car wash in 1 gallon of water.

TABLE 4

Comparative Tire Shine Gel.

| Ingredient | Wt. % in form |
|---|---|
| Water DX/RO | 56.380 |
| DANTOGARD ™ Liquid Plus Preservative[a] | 0.200 |
| ISOPAR ™ M Solvent[b] | 12.986 |
| Silicone Fluid 60,000 cSt | 7.998 |
| Silicone Fluid 30,000 cSt | 22.016 |
| NOVEMER ™ EC-1 Acrylic based thickener[c] | 0.420 |

[a]DANTOGARD ™ Liquid Plus Preservative: A Mixture of DMDM Hydantoin (70 wt. %), 3-Iodo-2-propynyl butylcarbamate (2.5 wt. %), and Butane-1,3-diol (4.5 wt. %).
[b]ISOPAR ™ M Solvent: Isoparaffinic hydrocarbon, i.e. hydrotreated light distillates (petroleum).
[c]NOVEMER ™ EC-1 Acrylic based thickener: A mixture of Acrylates/Acrylamide Copolymer (26-28 wt. %), Mineral Oil (20-50 wt. %), and Polysorbate 85 (1-3 wt. %).

Example 5—Semi-Permanent Tire Coating

The formulation of Example 3 is demonstrated in FIGS. 2A-2E. The non-oily finish was shown using a black glove. The dirt repelling aspect was shown by throwing muddy water.

The gloss/shine of the tire was measured for the semi-permanent coating of Example 3 using a Rhopoint Flex-20 gloss meter. This device allows measurement of the gloss of a surface at 20 degrees. The gloss/shine of the surface results in increased readings. Gloss was also measured after multiple car washes. The car wash solution that was used is a foam car wash with very high amounts of cleaning surfactants. The dilution ratio used for this car wash was 1 oz. of car wash in 1 gallon of water. The data are shown in Table 5 and demonstrate that even after multiple car wash cycles, the gloss does not return to untreated tire gloss readings, which indicates the presence of a semi-permanent coating.

TABLE 5

Gloss Measurements.

| Sample Gloss | Gloss measurement at 20 degrees |
|---|---|
| Virgin tire (untreated) | 0.1 |
| 2 coats of semi-permanent tire coating let to dry (1 coat material that is layered twice in a clockwise direction across the tire) | 11.36 |
| Treated tire after 1 wash and let to dry | 9.1 |
| Treated tire after 5 washes and let to dry | 9.1 |
| Treated tire after 10 washes and let to dry | 5.3 |

Example 6—Semi-Permanent Tire Coating

Figure 3:
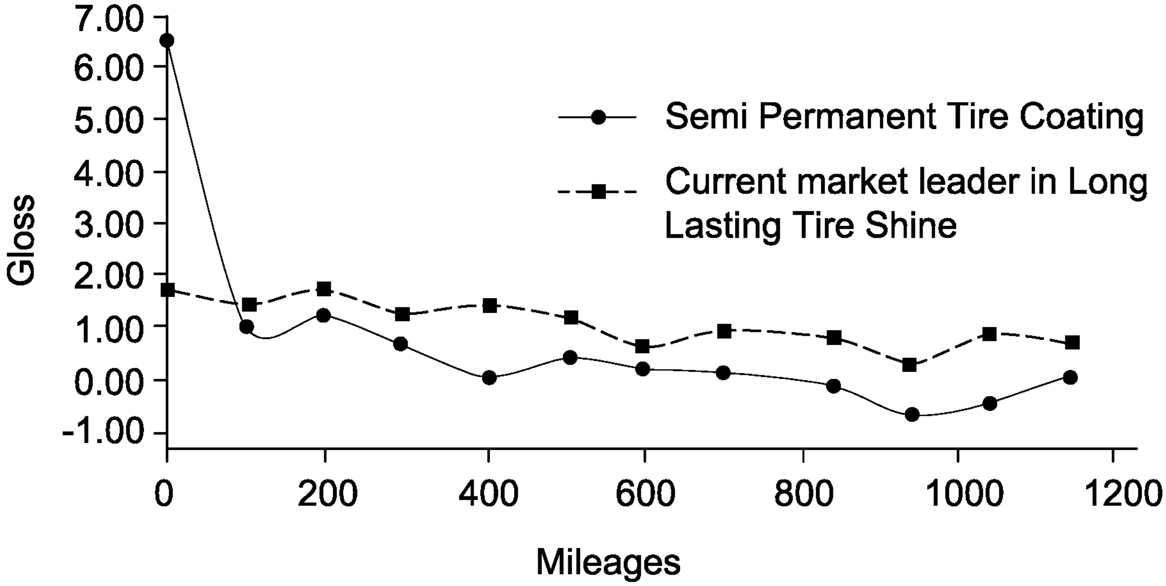
FIG. 3 depicts gloss per mileage for a comparative tire coating and a semi-permanent tire coating in accordance with the present disclosure.

The front tires of a car were treated with one coat of the semi-permanent tire coating of Example 3 on one side and one coat of a comparative tire spray on the other side. Both coats were let to dry for 8 hrs. The comparative tire spray is the market leader in long lasting tire shines. One coat is formed by applying the material twice in a clockwise direction across the tire. Afterwards, the gloss of the tire was measured at every 100 miles up to 1100 miles. As shown in FIG. 3, the gloss of the semi-permanent tire coating remained in the 1-2 range over 1000 miles. The average amount of miles driven by consumers in the United States of America is around 1125 miles per month according to the Department of Transportation. Therefore the coating lasts for weeks. The testing extended for ten days.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed disclosure. The term "consisting essentially of" occupies a middle ground between "comprising" and "consisting of".

Where a disclosure or a portion thereof is defined with an open-ended term such as "comprising," it should be readily understood that (unless otherwise stated) the description should be interpreted to also describe such a disclosure using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. An automotive surface composition comprising:
an amino functional silicone;
a silicone resin; and,
a catalyst, wherein the catalyst comprises tin, titanium, or a combination thereof; and,
wherein the amino functional silicone and the silicone resin are present in a ratio of from about 5:1 to about 9:1.

2. The composition of claim 1, wherein the amino functional silicone is an aminoalkyl-functional organopolysiloxane.

3. The composition of claim 1, wherein the silicone resin is selected from the group consisting of M, Q, T, D, MQ, MT, MD, QT, MDT, MQT and combinations thereof.

4. The composition of claim 1, wherein the catalyst comprises titanium (IV) isopropoxide.

5. A method of treating an automotive surface, the method comprising:
applying a composition to an automotive surface, wherein the composition comprises:
an amino functional silicone,
a silicone resin; and,
a catalyst, wherein the catalyst comprises tin, titanium, or a combination thereof;
and, wherein the amino functional silicone and the silicone resin are present in a ratio of from about 5:1 to about 9:1.

6. The method of claim 5, wherein the automotive surface is a tire.

7. The method of claim 5, wherein the composition remains on the automotive surface after at least about 25 washes.

8. The method of claim 5, wherein the composition remains on the automotive surface for at least about one year or more.

9. An automotive surface composition comprising:

an amino functional silicone;

a silicone resin;

a catalyst, wherein the catalyst comprises tin, titanium, or a combination thereof;

a first solvent; and, a second solvent; and, wherein the second solvent completely dissolves the first solvent.

10. The composition of claim 9, wherein the amino functional silicone is an aminoalkyl-functional organopolysiloxane.

11. The composition of claim 9, wherein the silicone resin is selected from the group consisting of M, Q, T, D, MQ, MT, MD, QT, MDT, MQT and combinations thereof.

12. The composition of claim 9, wherein the amino functional silicone and the silicone resin are present in a ratio of from about 0.1:1 to about 15:1.

13. The composition of claim 9, wherein the first solvent is selected from the group consisting of a hydrocarbon and a silicone solvent.

14. The composition of claim 9, wherein the second solvent has limited to full solubility in water.

15. A method of treating an automotive surface, the method comprising:

applying a composition to an automotive surface, wherein the composition comprises:

an amino functional silicone;

a silicone resin;

a catalyst, wherein the catalyst comprises tin, titanium, or a combination thereof;

a first solvent; and, a second solvent; and, wherein the second solvent completely dissolves the first solvent.

16. The method of claim 15, wherein the automotive surface is a tire.

17. The method of claim 15, wherein the composition remains on the automotive surface for at least about 4 weeks or more.

* * * * *